(12) United States Patent
Prigent et al.

(10) Patent No.: US 10,279,789 B2
(45) Date of Patent: May 7, 2019

(54) HYDRAULIC TRANSMISSION DEVICE

(71) Applicant: POCLAIN HYDRAULICS INDUSTRIE, Verberie (FR)

(72) Inventors: André Prigent, Saintines (FR); Pierre-Louis Houillon, Compiegne (FR); Julien Lambey, Compiegne (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 477 days.

(21) Appl. No.: 14/782,062

(22) PCT Filed: Apr. 3, 2014

(86) PCT No.: PCT/FR2014/050809
§ 371 (c)(1),
(2) Date: Oct. 2, 2015

(87) PCT Pub. No.: WO2014/162103
PCT Pub. Date: Oct. 9, 2014

(65) Prior Publication Data
US 2016/0046269 A1    Feb. 18, 2016

(30) Foreign Application Priority Data

Apr. 4, 2013  (FR) ...................... 13 53043

(51) Int. Cl.
*F16D 31/02* (2006.01)
*B60T 11/10* (2006.01)
(Continued)

(52) U.S. Cl.
CPC ............ *B60T 11/103* (2013.01); *F16H 39/42* (2013.01); *F16H 61/431* (2013.01); *F16H 61/472* (2013.01)

(58) Field of Classification Search
CPC ...... F16H 61/431; F16H 61/472; B60T 11/10; B60T 11/103
(Continued)

(56) References Cited

U.S. PATENT DOCUMENTS 3,049,884 A    8/1962   Schroeder
7,082,760 B2 *  8/2006   Legner ................... F16H 39/20
                                                   60/484

(Continued)

FOREIGN PATENT DOCUMENTS

FR         2 504 987 A1    11/1982

OTHER PUBLICATIONS

English Translation of Search Report dated Jul. 2, 2014, in corresponding International PCT Application No. PCT/FR2014/050809, filed on Apr. 3, 2014 (2 pages).

*Primary Examiner* — Michael Leslie
(74) *Attorney, Agent, or Firm* — The Webb Law Firm (57) ABSTRACT

Hydraulic transmission apparatus (20) including a pump (24) having a variable cylinder capacity and feeding one or more hydraulic motors (26A, 26B), and a control unit (50). In the apparatus, the feed and discharge orifices of the motors are arranged in such a manner that, when the pressures at said orifices are equal, the outlet torque from the motors is zero. To make the apparatus inactive, without physically bypassing the motors, the control unit is suitable for operating the apparatus in a "torque-free" mode by regulating the cylinder capacity of the pump in such a manner that the pressures at said feed and discharge orifices remain substantially equal.

18 Claims, 3 Drawing Sheets

(51) Int. Cl.
*F16H 61/431* (2010.01)
*F16H 61/472* (2010.01)
*F16H 39/42* (2006.01)

(58) Field of Classification Search
USPC .......................................................... 60/489
See application file for complete search history.

(56) References Cited

U.S. PATENT DOCUMENTS

| | | | |
|---|---|---|---|
| 7,614,226 B2 * | 11/2009 | Legner | F16H 61/421 60/489 |
| 8,024,925 B2 * | 9/2011 | Cronin | F16H 61/472 60/451 |
| 8,474,254 B2 * | 7/2013 | Hughes, IV | E02F 9/2203 60/445 |
| 8,978,375 B2 * | 3/2015 | Prigent | F16H 61/4096 60/489 |
| 2007/0101709 A1 | 5/2007 | Cronin | |

* cited by examiner

HYDRAULIC TRANSMISSION DEVICE

CROSS-REFERENCE TO RELATED APPLICATIONS

This application is the U.S. national phase entry under 35 U.S.C. § 371 of International PCT Application No. PCT/FR2014/050809, filed on Apr. 3, 2014, which claims priority to French Patent Application No. FR 1353043, filed on Apr. 4, 2013, the entireties of each of which are incorporated by reference herein.

The invention relates to hydraulic transmission apparatus of the type comprising a pump having a variable delivery rate, at least one hydraulic motor fed by the pump, and a control unit; and the invention also relates to a method of controlling such apparatus. In the hydraulic transmission apparatus, the motor(s) is/are fed by the pump in such a manner that the fluid flow rate passing through the motor(s) is substantially equal to the delivery rate of the pump.

Such apparatus can generally be activated or deactivated, depending on whether or not it is desired to benefit from the (drive or braking) torque that said apparatus is suitable for applying to the outlet member(s) of the motor(s).

In known manner, in order to activate and deactivate such apparatus, the hydraulic circuit connecting the pump to the motor is provided with an activation valve having at least two positions: in the activation position, the main orifices of the motor are connected to the main orifices of the pump, thereby enabling the pressurized fluid delivered by the pump to actuate the motor. Conversely, in the deactivation position or "bypass position", the main orifices of the motor are connected to each other (and in general to a low or zero pressure source). In that way, the fluid pressures at the two orifices are equal, and the motor does not generate any torque on its outlet member.

A drawback with such an arrangement is that each time the apparatus goes over from the activated state to the deactivated state or vice versa, it is necessary for the slide of the activation valve to be moved. In addition to the fact that such switching-over is not very fast, it also gives rise to wear on the valve, generates pressure peaks that are harmful in the hydraulic circuit, and therefore gives rise to a maintenance cost.

A first objective of the invention is thus to propose an improvement of apparatus as presented in the introduction, which improvement makes it possible to reduce the stresses and wear to which said apparatus is subjected during its activations and deactivations.

This first objective is achieved by the fact that, in the apparatus, said at least one motor is arranged in such a manner that when the pressures in the feed and discharge orifices of said at least one motor are equal, the outlet torque from said at least one motor is zero; and by the fact that the control unit is suitable for operating the apparatus in a "torque-free" mode by regulating the cylinder capacity of the pump in such a manner that the pressures at said feed and discharge orifices remain substantially equal.

Since these pressures are substantially equal, in this operating mode said at least one motor does not deliver any torque.

It should be noted that the expression "said feed and discharge orifices of said at least one motor" means at least one feed orifice and at least one discharge orifice of the motor(s). In general, it designates a single feed orifice and a single discharge orifice, which orifices are connected respectively to the delivery orifice and to the intake orifice of the pump. These orifices can be identified as sections of feed or discharge ducts.

In addition, the invention is, in particular, applicable to apparatus having a plurality of hydraulic motors in which, for example, the feed or discharge orifices of all of them are equipped with pressure sensors; the apparatus further comprising regulation means for each motor for regulating the pressures between the feed and discharge orifices of said motor in such a manner that said pressures remain substantially equal to each other.

In addition, the invention is applicable to apparatus in which the hydraulic circuit connecting the pump to the motor(s) can be either open or closed.

It can be understood that, in "torque-free" mode, the flow of fluid between the pump and the motor(s) is not interrupted, and the hydraulic transmission apparatus remains in the "activated" state.

If the apparatus has an activation valve suitable for isolating the motor(s) from the pump, the position of said activation valve thus remains unchanged when going over to torque-free mode.

Thus, advantageously, in the torque-free mode, by means of the regulation of the cylinder capacity of the pump that is performed by the control unit, the transmission apparatus produces the same effects as if the activation valve were placed in the bypass position, namely it does not generate any torque on the outlet member(s) of the motor(s). The hydraulic transmission apparatus thus operates as if it were bypassed, even though it is not physically bypassed in a dedicated line, since the hydraulic fluid continues to flow between the pump and the motor(s).

Therefore, it is no longer necessary to provide the circuit with an activation valve as described above.

However, in certain embodiments, such a valve may be provided. The hydraulic transmission apparatus then further comprises an activation valve suitable, in a first position, for putting the pump into communication with the motor(s) so as to feed it or them, and, in a second position, conversely, for isolating the pump from the motor(s). It can be understood implicitly that putting the pump into communication with the motor(s) refers to putting the two main orifices of the pump into communication with respective ones of the feed and discharge orifices of the motor(s).

Within the apparatus, the control unit may be arranged in various manners in order to operate the apparatus in a torque-free mode.

In an embodiment, the apparatus further comprises pressure sensors suitable for transmitting to the control unit the values of the pressures at the feed and discharge orifices of said at least one motor; and the control unit is arranged in such a manner that, in the torque-free mode, the control unit determines and regulates the cylinder capacity of the pump on the basis of the pressure information given by the pressure sensors.

The "torque-free" mode may also be optimized in the following manner: in an embodiment, the hydraulic transmission apparatus may further comprise an exchange valve, connected to the feed and discharge orifices of said at least one motor, and arranged in such a manner that the lower of the pressures prevailing at said orifices does not exceed a predetermined value. The predetermined value is chosen to be sufficiently low for the fluid flow in the motors, in torque-free mode, to consume the least energy possible.

In addition, when the motor(s) are motors having positively declutchable radial pistons, the apparatus may, in particular, further comprise means for ensuring that, in torque-free mode, the pistons remain retracted inside the cylinders.

If the motors are then motors in which the pistons retract into the cylinders of the motors when the pressure in the cylinder ducts becomes lower than a retraction pressure, the predetermined value indicated above is chosen to be less than the retraction pressure. Therefore, in torque-free mode, the pistons are retracted inside the cylinders of the motors.

The invention may be implemented, in particular, in a vehicle equipped with a main transmission and in which the hydraulic transmission apparatus of the invention constitutes the auxiliary transmission. The main transmission may, in particular, be mechanical, hydraulic, or electric.

The hydraulic transmission apparatus of the invention is then hydraulic assistance apparatus, which serves merely on a supplementary basis to assist the drive of the vehicle. In general, it enables the wheels of an axle that are not driven by the main transmission to be driven; these wheels may be front wheels or rear wheels.

For example, in an embodiment, the vehicle may include an internal combustion engine, and a mechanical main transmission, and the pump is driven by an outlet shaft associated with said engine or with a gearbox coupled to said engine.

In another embodiment, the main transmission is hydraulic and includes its own pump that is controlled as a function of the speed that is desired for the vehicle. Conversely, the pump of the apparatus of the invention (constituting the auxiliary transmission) is controlled on the basis of parameters other than the speed of the vehicle, e.g. as a function of minimum pressures to be complied with.

In this embodiment, the cylinder capacities of the pumps of the main transmission and of the auxiliary transmission are therefore controlled on the basis of entirely different criteria, including when said pumps are both driven by the same outlet shaft of the main motor of the vehicle.

When the apparatus of the invention constitutes an auxiliary transmission, and when the vehicle is thus equipped both with a main transmission and with an auxiliary transmission, the use of an activation valve has the following advantages:

When the vehicle reaches a high speed, the speed of rotation of the wheels can be too high for the hydraulic motors that are coupled to the wheels and that are part of the auxiliary transmission. It is then necessary to declutch these motors.

For this purpose, it can be useful for the apparatus to have an activation valve, which makes it possible to isolate the pump from said motors at said speed. This enables the vehicle equipped with the transmission apparatus to be able to move at a speed higher than the speed reached when the flow rate passing through said motor(s) reaches the maximum allowable flow rate for said motor(s).

In addition, these motors actually being taken out of operation (in particular them being positively declutched by retraction of the pistons) by means of the activation valve makes it possible to improve the energy efficiency of the transmission apparatus in the modes of use in which assistance is not required. The motors being taken out of operation in this way makes it possible to avoid the hydraulic motors undergoing friction (hydraulic drag) that is relatively high.

When the apparatus is mounted in a vehicle, the invention may be implemented in the following manner.

The vehicle has vehicle mover members, e.g. wheels, that enable it to move. In the following explanation, it is assumed that these mover members are wheels, and it is assumed that some of the wheels are driven by the hydraulic motors of the apparatus. (This embodiment may however be implemented for other types of mover member, e.g. crawler tracks, and/or when the apparatus has only one hydraulic motor).

While the vehicle is moving, the speed of the vehicle constrains the wheels to rotate at a certain speed of rotation.

Advantage can be taken of this property as follows: when the hydraulically driven wheels are driven by the hydraulic motors at the speed of rotation imposed by the speed of the vehicle, they deliver zero torque. They are therefore de facto operated in torque-free mode, and the pressures at the feed and discharge main orifices of the hydraulic motors are equal.

This property thus makes it possible to implement the invention in the following manner.

The apparatus may further comprise acquisition means suitable for transmitting to the control unit information making it possible to determine the value of the speed of rotation of a vehicle mover member used as a reference (e.g. the speed of rotation of a wheel), and a pump speed sensor suitable for transmitting to the control unit information making it possible to determine the speed of rotation of the rotor of the pump.

The control unit may then be arranged in such a manner that, in torque-free mode, it determines the value of the speed of rotation of the reference mover member and the speed of rotation of the rotor of the pump, and it regulates the delivery rate of the pump as a function of the speed of rotation of the rotor of the pump in such a manner that the outlet member of said at least one motor turns at a speed equal to the speed determined for the reference mover member.

Since the speed of rotation of the reference mover member can be determined, it is possible, given the cylinder capacity of the hydraulic motor(s) to determine the fluid flow rate necessary for the hydraulic motor(s) so that the outlet member(s) of the motor(s) turn(s) at said speed.

Once this flow rate is determined, it is possible, given the speed of rotation of the pump, to determine the pump cylinder capacity necessary for generating this flow rate, and thus to regulate the delivery rate of the pump at a value appropriate so that the hydraulic motors are driven at the same speed as the reference mover member.

This embodiment concerns, in particular, vehicles firstly having wheels driven by a main transmission (which may be mechanical or of some other type), and secondly wheels driven by the auxiliary transmission constituted by the hydraulic transmission apparatus.

The mover member used as a reference is then preferably a wheel of the vehicle that is driven by the main transmission.

The above-described regulation of the pump cylinder capacity enables the wheels driven by the hydraulic motor(s) to turn at the same speed as the wheels driven by the main transmission.

Optionally, the hydraulic transmission apparatus may further comprise pressure sensors suitable for transmitting to the control unit the values of the pressures at the feed and discharge orifices of said at least one motor, and the control unit may be arranged in such a manner that, in torque-free mode, the control unit checks that the difference between the pressures at the feed and discharge orifices of said at least one motor is less than a predetermined value, on the basis of the pressure information given by said pressure sensors.

For example, if the difference in the pressures exceeds the chosen predetermined value, a warning may be transmitted to the driver of the vehicle so that said driver takes the necessary steps.

The pump speed sensor may be constituted by any information collection equipment making it possible to determine the speed of rotation of the rotor of the pump. This sensor may, for example, comprise a speed sensor for sensing the speed of an engine connected to the pump, the speed of the engine being representative of the speed of rotation of the rotor of the pump.

The above-mentioned acquisition means, which deliver the information making it possible to determine the speed of rotation of the reference mover member, may be constituted by a sensor directly measuring the speed of rotation of a shaft driven by a hydraulic motor.

Said acquisition means may also comprise, in particular, a sensor measuring the speed of rotation of a wheel, e.g. an Anti-Lock Blocking System (ABS) sensor associated with the wheel.

These acquisition means may also comprise an acquisition system suitable for delivering the speed of the vehicle at a given instant; for example, such an acquisition system may be a Global Positioning System (GPS) indicating the speed of the vehicle. The speed of rotation of the reference mover member is then determined on the basis of the speed of the vehicle.

In a vehicle having an engine and a main transmission with a gearbox, in addition to the hydraulic auxiliary transmission, the acquisition means may comprise a sensor or a system indicating the gearbox gear ratio that is engaged, and a second sensor indicating the speed of revolution of the engine. The speed of rotation of the reference mover member is then determined by combining the information delivered by the two sensors.

In addition to operating in "torque-free" mode, the apparatus of the invention may have other operating modes.

When it is implemented in a vehicle having front mover members (e.g. wheels) and rear mover members, relative to the direction of movement of the vehicle, the apparatus of the invention generally has a main operating mode that is referred to as the "assistance mode". In this operating mode, the motor(s) is/are fed by the pump in such a manner as to be able to deliver drive torque; and the cylinder capacity of the pump is generally maintained at a fixed value Cy. This cylinder capacity Cy is determined in such a manner that the speed of rotation of the front mover members is not less than (and is, in practice, generally slightly greater than) the speed of rotation of the rear mover members.

When the apparatus is mounted in a vehicle having a main transmission with a gearbox, and a hydraulic auxiliary transmission constituted by the apparatus, there is one cylinder capacity Cy per gear ratio of the gearbox of the vehicle.

The fact that the cylinder capacity is "generally" maintained at a fixed value means that it is, nevertheless, possible, under certain particular circumstances, for the cylinder capacity of the pump to be regulated instead of being maintained fixed. An example of such particular circumstances is developed below.

An effect of maintaining the cylinder capacity of the pump at a fixed value is that the higher the speed of rotation of the main motor driving the pump, the more the drive torque increases: thus, advantageously, the more the wheels driven by the main transmission spin, the more the drive torque increases.

The assistance mode normally consists in causing the hydraulic transmission apparatus to operate while maintaining the cylinder capacity of the pump at the above-presented fixed value Cy.

However, in practice, in the assistance mode, it is preferable for the motor(s) to deliver at least a minimum amount of drive torque at all times. To achieve this, in the assistance mode, the feed pressure of the motors is regulated at certain times, in such a manner as to remain greater than a predetermined minimum value.

In a variant, the assistance mode may thus also consist in operating as follows: if the pressure at the feed orifice(s) of the motor(s) is greater than or equal to a threshold pressure, the cylinder capacity of the pump is maintained fixed; if the pressure at the feed orifice(s) of the motor(s) is tending to become less than the threshold pressure, the cylinder capacity of the pump is regulated in such a manner that the pressure at the feed orifice is substantially equal to the threshold pressure.

In addition, in another drive operating mode that is possible in apparatus of the invention, the control unit operates the apparatus in such a manner that the feed pressure of said at least one motor remains greater by at least a predetermined value than the pressure at the discharge orifice(s) of the motor(s).

The apparatus of the invention may also have a braking mode. In this mode, the cylinder capacity of the pump is regulated in such a manner that the pressure at the discharge orifice(s) of the motor(s) is greater than the pressure at the feed orifice(s) of the motor(s) by a value that is a function of a braking command transmitted to the vehicle or to the machine of which the apparatus is part.

Finally, the apparatus of the invention can have an operating mode referred to as the "restraint mode", in which relatively low braking torque is delivered to the outlet shaft(s) of the motor(s). In this operating mode, the control unit operates the apparatus by regulating the cylinder capacity of the pump in such a manner that the pressure at the discharge orifice of said at least one motor is greater by at least a predetermine value (e.g. at least 10 bars and preferably at least 20 bars) than the pressure at the feed orifice(s) of the motor(s). The utility of this operating mode is developed below.

The invention may be particularly advantageously applied to vehicle hydraulic transmission apparatus, in order to improve operation of such apparatus during braking.

Thus, a second object of the invention is a vehicle including braking apparatus, hydraulic transmission apparatus as defined above, and at least one vehicle mover member driven by said at least one motor; the vehicle having an operating mode in which, when the braking apparatus is actuated, the control unit operates the hydraulic transmission apparatus in torque-free mode.

Advantageously, in torque-free mode during braking, without it being necessary either to bypass the hydraulic transmission apparatus or to change the position of any activation valve, the hydraulic transmission apparatus finds itself placed in a mode in which it does not disturb the braking of the vehicle in any way, because no torque is delivered by the motor(s).

Naturally, the vehicle may have operating modes other than the above-indicated "torque-free" mode for braking. In addition to the "torque-free" mode, it can thus have an operating mode in which the hydraulic transmission apparatus is deactivated and, when the braking apparatus is actuated, the control unit does not intervene, and thus does not operate the hydraulic transmission apparatus in "torque-free" mode.

In an embodiment, the control unit is arranged so that, at the end of braking, it automatically operates the apparatus in restraint mode.

In the preceding sentence, the term "automatically" means that no action from the driver of the vehicle, other than the main or primary action (i.e. the driver ceasing to depress the brake pedal in this example) is necessary to obtain the desired operation, namely, in this example, putting the apparatus in restraint mode.

It is particularly useful or important for the vehicle to have such a capacity because, at the end of braking, i.e. when the braking command ceases to be transmitted or applied to the vehicle (the driver releases the brake pedal), it may be desirable, in particular when going downhill, for the hydraulic transmission apparatus not to go back into a drive mode immediately after braking stops. Such reactivation while going downhill could cause a dangerous acceleration of the vehicle.

If the control unit is arranged in such a manner as to operate the hydraulic transmission apparatus in restraint mode as soon as the braking is interrupted or ceases (until a new command is transmitted to the control unit), the driver can be sure that the hydraulic transmission apparatus will not deliver undesirable drive torque at the time at which the driver takes the foot off the brake pedal.

In restraint mode, it is therefore necessary to apply an additional command to the vehicle to reactivate the hydraulic transmission apparatus and to put it in assistance mode.

For this purpose, the control unit may be arranged so that, if an acceleration command is transmitted to the vehicle while said vehicle is in restraint mode, said control unit automatically causes the hydraulic transmission apparatus to go over to assistance mode.

Thus when the apparatus is in restraint mode, a single action from the driver of the vehicle (depressing the accelerator pedal) suffices to cause the hydraulic transmission apparatus to go over from restraint mode to assistance mode.

Advantageously, the various above-indicated operating modes (restraint, torque-free, and assistance) may be implemented while the transmission apparatus remains activated; i.e. if, for example, the apparatus includes an activation valve as described above, the apparatus can be operated in said various operating modes while the activation valve remains in the activation position.

Going over from one of the various operating modes of the hydraulic transmission apparatus to another may be triggered by the driver of the vehicle. For example, going over to torque-free mode, restraint mode, or assistance mode may be achieved on command from the driver of the vehicle.

This command may take effect immediately or in deferred (time-delayed) manner.

Going over from one operating mode to another may also be triggered automatically by the control unit of the apparatus, when predetermined conditions required for such a change-over are satisfied.

The control unit may thus trigger going over from restraint mode to assistance mode, or vice versa, as a function of one or more parameters chosen from among the speed of the vehicle, the engaged gear ratio of the gearbox, the position of the accelerator pedal, and more generally the value delivered by any other sensor, e.g. an inclinometer. (The "gear ratio of the gearbox" refers to the gear ratio of a gearbox of the mechanical main transmission, for a vehicle including such a main transmission and a hydraulic transmission constituted by the hydraulic apparatus of the invention).

For example, the control unit may trigger going over from the restraint mode to the assistance mode when the position of the accelerator pedal goes beyond a predefined value, typically 15% of the stroke of the pedal, and preferably subject to the speed of the vehicle being greater than a predetermined minimum speed.

For example, the control unit may trigger going over from the restraint mode to the torque-free mode when the speed of the vehicle is less than a predetermined value, e.g. 1 kilometer per hour (km/h).

For example, the command may trigger going over from the assistance mode to the restraint mode when the position of the accelerator pedal is less than a predetermined value, e.g. 5% of the stroke of the pedal, and/or when downhill slope information (detected, for example, by an inclinometer, by a GPS, and/or by use of the service brake) is received by the control unit.

When the apparatus includes an activation valve, suitable, in a first position, for putting the pump into communication with said at least one motor so as to feed it, and, in a second position, conversely, for isolating the pump from said at least one motor, the control unit may be designed so that:
  immediately after the activation valve goes over from the second position to the first position (i.e. goes over to the activated mode), and/or immediately before the activation valve goes over from the first position to the second position (i.e. goes over to the deactivated mode), said control unit either operates the apparatus in torque-free mode or regulates the cylinder capacity of the pump in such a manner that the feed pressure of said at least one motor is not less than a predetermined value (the first of these control modes makes it possible to avoid a jolt on activating or on deactivating the hydraulic assistance); and/or
  said control unit triggers a change-over of the activation valve so that it goes over from the first position to the second position (i.e. goes over to the deactivated mode) when the position of the accelerator pedal becomes less than a predetermined value and when the engaged gear ratio of the gearbox is strictly less than a maximum gear ratio of the gearbox that can be engaged with the hydraulic apparatus.

A second objective of the invention is to propose a method of controlling hydraulic transmission apparatus, which apparatus comprises a pump having a variable delivery rate, at least one hydraulic motor, fed by the pump, and a control unit, which method makes it possible to reduce the stress and wear to which the hydraulic transmission apparatus is subjected during its activations and deactivations.

This objective is achieved by the fact that, in the hydraulic transmission apparatus, the motor(s) is/are arranged in such a manner that when the pressures in the feed and discharge orifices of the motor(s) are equal, the outlet torque from the motor(s) is zero; and by the fact that, during a period (period of declutching of the apparatus), the apparatus is operated in a "torque-free" mode, in which the cylinder capacity of the pump is regulated in such a manner that the pressures at said feed and discharge orifices remain substantially equal.

The fact that the apparatus is caused to operate in "torque-free" mode makes it possible to declutch the apparatus and to place it in a state in which no torque is applied by the motor(s). Advantageously, the "torque-free" mode can be used without it being necessary to cause the position of an activation valve to change.

The regulation of the pump for implementing the torque-free mode can be achieved in various manners.

In an implementation of the method, the apparatus further comprises pressure sensors suitable for transmitting to the control unit the values of the pressures at the feed and discharge orifices of said at least one motor; and in the torque-free mode, the cylinder capacity of the pump is determined on the basis of the pressure information given by said pressure sensors.

Another implementation concerns the situation when the apparatus is mounted in a vehicle.

In such a situation, in an implementation of the method, the value of the speed of rotation of a vehicle mover member used as a reference is acquired, as is the value of the speed of rotation of the rotor of the pump; and, in torque-free mode, the delivery rate of the pump is regulated as a function of the speed of rotation of the rotor of the pump in such a manner that the outlet member(s) of the hydraulic motor(s) turn(s) at a speed equal to the speed of rotation of the reference mover member.

In addition, the method may be improved by also enabling the apparatus to be operated in the above-mentioned restraint mode, in which the cylinder capacity of the pump is regulated in such a manner that the pressure at the discharge orifice of said at least one motor is greater by at least a predetermined value than the pressure at the feed orifice of said at least one motor.

The method may be implemented, in particular, when the hydraulic transmission apparatus is mounted in a hydraulically driven vehicle including braking apparatus, hydraulic transmission apparatus as presented above, and at least one vehicle mover member driven by said at least one motor.

More particularly, when the apparatus is mounted in a vehicle having two axles with driven wheels, a front one of the axles being situated in front of the "rear" other axle, relative to the direction of movement of the vehicle, and the wheels of a single one of said axles being driven by the hydraulic transmission apparatus, the method may, in addition, make it possible, during an assistance period, to operate the apparatus in an operating mode in which the cylinder capacity of the pump is generally maintained at a fixed value determined in such a manner that the speed of rotation of the wheels of the front axle is not less than the speed of rotation of the wheels of the rear axle.

In the preceding definition, an axle having driven wheels means a group of wheels (or of other vehicle mover members) that are at the same level relative to the longitudinal direction of the vehicle, and that are driven, be it by a mechanical transmission, a hydraulic transmission, or some other type of transmission.

The fact that the speed of rotation of the wheels on the front axle is not less than the speed of rotation of the wheels on the rear axle has the effect of putting the vehicle under slight tension that makes the vehicle easier to drive.

The various operating modes of the apparatus that are presented above may, in particular, be triggered under the following circumstances (independently or in combination):
- while the braking apparatus of the vehicle is being actuated, the hydraulic transmission apparatus is operated in torque-free mode;
- when the braking apparatus of the vehicle ceases to be actuated, the hydraulic transmission apparatus is operated in restraint mode; and
- if, while in restraint mode, the driver accelerates, the hydraulic transmission apparatus is then put into assistance mode.

Figure 1:
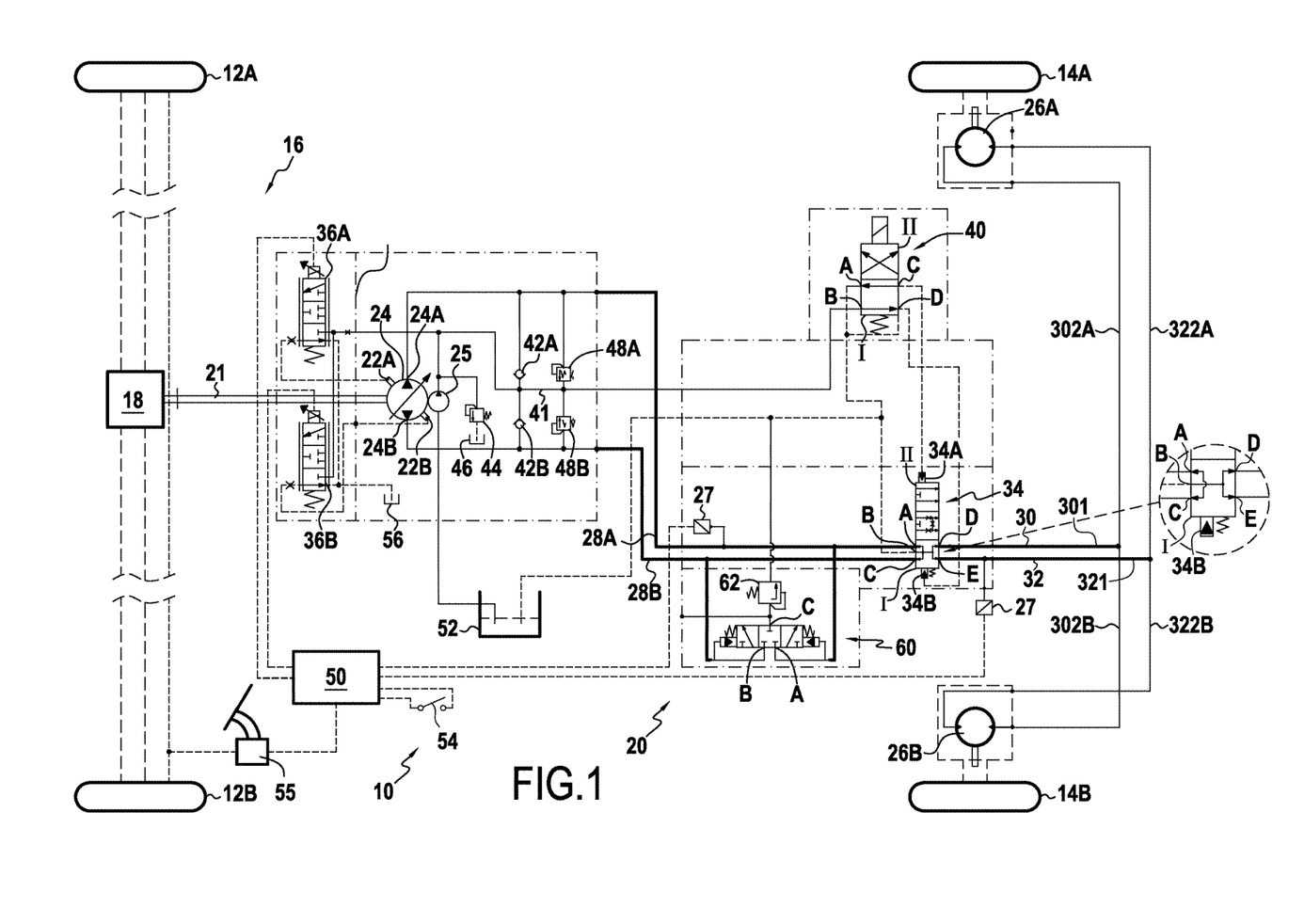
FIG. 1 is a diagrammatic view of a first embodiment of apparatus of the invention.

The invention can be well understood and its advantages appear more clearly on reading the following detailed description of an embodiment shown by way of non-limiting example. The description refers to the accompanying drawings, in which:

FIG. 1 shows a vehicle 10 in which hydraulic transmission apparatus 20 of the invention is mounted.

The vehicle 10 is a vehicle having two rear wheels 12A, 12B, and two front wheels 14A, 14B. In the normal state, the drive for the vehicle is provided by a main transmission 16. Said main transmission connects an internal combustion engine 18 to the rear wheels 12A and 12B, and thus it alone provides the drive for the vehicle most of the time.

Although this embodiment includes an engine 18 of the internal combustion type, the invention may be implemented with any type of engine or motor, be it an engine fueled by gasoline, liquefied petroleum gas (LPG), etc. or an electric motor, or indeed a motor or an engine of some other type.

For propelling the vehicle under difficult road conditions (sloping road, slippery road, etc.), the vehicle also has an auxiliary transmission, constituted by the hydraulic transmission apparatus 20. Said hydraulic transmission apparatus makes it possible to render the two wheels 14A and 14B driven wheels even though they are not driven wheels under normal circumstances. Thus, by means of the auxiliary transmission 20, the vehicle has operating modes in which all four wheels 12A, 12B, 14B, and 14B are driven wheels.

Although in this embodiment, the hydraulic assistance is applied to the front wheels 14A and 14B, it could equally well be applied to the rear wheels.

The auxiliary transmission 20 is coupled to a shaft 21 that is connected to the power outlet of the engine 18, from which it draws the energy that it transmits to the wheels 14A, 14B when it is activated.

The auxiliary transmission 20 constitutes "hydraulic transmission" or "hydraulic assistance" apparatus in the meaning of the invention. This apparatus transmits a fraction of the energy from the engine 18 to the wheels 14A, 14B, and, in addition, performs various functions: activation/deactivation of the auxiliary transmission; making the auxiliary transmission members safe during the deactivated mode, etc.

For driving the wheels 14A, 14B, the hydraulic transmission apparatus 20 firstly includes two pressurized fluid sources: a main pump 24, and an auxiliary pump 25 designed to maintain a minimum fluid pressure in various ducts of the apparatus.

The main pump 24 is a reversible pump having a variable delivery rate, of the type having a swashplate.

Both the main pump 24 and the auxiliary pump 25 are connected to the outlet shaft 21 of the engine 18, and are therefore actuated by it together.

The pumps 24 and 25 are controlled with different underlying logic: The pump 24 has a variable cylinder capacity, which can be regulated by modifying the position of its swashplate cam. Conversely, the pump 25 has a fixed cylinder capacity; its delivery pressure is limited by the pressure limiter 44 in such a manner as to maintain a given minimum pressure (the "boost pressure") in various ducts of the circuit.

The main pump 24 is designed to feed pressurized fluid to two hydraulic motors 26A, 26B coupled to respective ones of the two wheels 14A, 14B. For this purpose, the pump 24 has two pump ducts 28A, 28B connected to its main orifices 24A, 24B.

These pump ducts 28A, 28B may be put into communication with respective ones of the two motor ducts 30, 32. Each of these motor ducts has a first portion 301, 321 suitable for being connected to a pump duct, and a second portion in which each duct splits into two branches 302A, 302B, and 322A, 322B respectively, which branches are connected to feed and discharge enclosures of the motors 26A and 26B.

The pressure in that one of the pump ducts 28A, 28B that has the lower pressure is limited by an exchange valve 60. This valve 60 is a valve having three positions, with two upstream ports A and B, one downstream port C, and two opposing hydraulic control chambers.

The upstream ports A and B are connected to respective ones of the pump ducts 28A and 28B. The downstream port C is connected via a pressure limiter 62 to an unpressurized reservoir 52 (i.e. to a reservoir at atmospheric pressure).

The valve 60 is urged into the middle position by opposing return springs having mutually equal return forces.

In its middle position, which is taken up when the pressures in the two pump ducts are substantially equal, the exchange valve 60 keeps the three ports A, B, and C isolated.

Conversely, the end positions correspond to the following situations: When the pressure difference between the pump ducts 28A, 28B exceeds a predetermined value, the exchange valve takes up the end position in which it puts the upstream port connected to the lower-pressure duct into communication with the port C.

Therefore, when the pressures in the two pump ducts are not equal, the lower-pressure pump duct removes the fluid to the reservoir 52 so long as the pressure prevailing in said reservoir remains greater than the rating pressure of the pressure limiter 62.

As a result, when the pressures in the two pump ducts are not equal, the exchange valve 60 constrains the pressure in the lower-pressure duct to remain equal to the value of said rating pressure, which is referred to as the "exchange pressure" $P_E$. In the vehicle 10, this pressure $P_E$ is equal to 22 bars.

It should be noted that, in the apparatus 20, the exchange valve 60 is optional. It is not necessary to operation of the invention.

In a manner known per se, the motors 26A, 26B are hydraulic motors having radial pistons, similar to the motors described, for example, in French Patent No. 2 504 987.

These motors may be engaged or disengaged (clutched or declutched) in particular, but not only, by causing the pressure prevailing in their casings to vary.

Each of the motors 26A, 26B has an outlet shaft, connected to a respective one of the wheels 14A, 14B. Under the effect of the pressure difference imposed by the main pump between the pump ducts, and thus between the motor ducts, in the drive mode the motors 26A and 26B deliver drive torque that enables them to drive the wheels 14A, 14B.

Conversely, when the pressure difference imposed by the main pump reverses between the pump ducts, and thus between the motor ducts (the pressure at the delivery orifice of the pump 24A then being less than the pressure at its feed orifice 24B), the apparatus 20 is in braking mode, and the motors 26A and 26B deliver braking torque that tends to brake the wheels 14A, 14B.

The pump ducts 28A, 28B and the motor ducts 30, 32 are put into communication by means of an activation valve 34.

The general function of this valve 34 is to activate or to deactivate the auxiliary hydraulic transmission (i.e. the hydraulic assistance apparatus 20):

in deactivated mode, only the main transmission serves to drive the vehicle; and in the activated mode, the main transmission and the hydraulic transmission can drive the vehicle together. However, in this mode, the hydraulic transmission 20 can, at times, be inactive (or declutched) and the motors do not deliver any torque, namely when the apparatus is operated in the torque-free mode presented above.

The valve 34 has three upstream ports A, B, C, two downstream ports D and E, and two positions I and II. An intermediate position taken up in merely transient manner is also shown in FIG. 1.

The activation valve 34 also has two hydraulic control chambers 34A, 34B.

In this text, the terms "upstream" and "downstream" as applied to the ports of a valve designate, in general, the most frequent direction of flow of fluid or of transmission of a command, without this excluding other operating modes.

Ports A and C are connected to respective ones of the pump ducts 28A and 28B. Port B is connected to the reservoir 52.

Ports D and E are connected to respective ones of the first portions 301 and 321 of the motor ducts 30 and 32, and are thus connected to respective ones of the feed and discharge orifices of the motors 26A and 26B.

The control chambers 34A and 34B are connected to respective ones of the ports C and D of a control valve 40 that is described below.

The activation valve 34 is also provided with a return spring that urges the valve 34 to stay in the first position I.

In the first position I, ports B, D, and E are interconnected, and ports A and C are interconnected. In the second position II, ports A and D are interconnected, ports C and E are interconnected, and port B is isolated.

As shown by the intermediate box shown in FIG. 1 for the valve 34, in the intermediate position between the positions I and II, the four ports A, C, D, and E are interconnected via constrictions, while, conversely, port B is isolated.

Thus, in the first position I, the pump ducts 28A, 28B are interconnected (bypass position). In addition, the motor ducts 30 and 32 are interconnected; they are also connected to the unpressurized reservoir 52. In this position, the pistons of the motors 26A and 26B take up the retracted position in which they are retracted into the cylinders of said motors, in such a manner that the motors 26A and 26B are declutched.

Conversely, in the second position II, the motor ducts are connected to the pump ducts and they feed the motors 26A, 26B so that they drive the wheels 14A, 14B. This position is taken up to put the vehicle in four wheel drive mode and corresponds to the state of activity of the hydraulic transmission 20.

The apparatus 20 is fed with fluid in the following manner.

The delivery orifice of the auxiliary pump 25 is connected to a boost duct 41. This duct 41 is connected to an unpressurized reservoir 46, which is at atmospheric pressure, via a pressure limiter 44. The pressure limiter 44 enables the pressure at the delivery orifice of the pump 25 to be maintained at a relatively low pressure $P_G$ (30 bars), referred to as the "boost pressure".

The duct 41 is also connected to the pump ducts 28A, 28B via check valves 42A, 42B. This connection makes it possible to ensure that the pressure in the pump ducts remains, in principle, not less than the boost pressure $P_G$ at all times.

In addition, the pump ducts 28A, 28B are connected to the duct 41 via pressure limiters 48A, 48B, also in order to avoid any excessive pressure.

As indicated above, the transmission apparatus 20 includes a control solenoid valve 40, which enables it to be put in the activated mode or in the deactivated mode in the following manner.

This solenoid valve 40 has two upstream ports A and B, two downstream ports C and D, two positions I and II, and a return spring that urges it to stay in its position I.

Port A is connected to the unpressurized reservoir 52 (that can be the same as the reservoir 46). Port B is connected to the boost duct 41. Ports C and D are connected to the control chambers 34A and 34B, as indicated above.

In position I, ports A and C are interconnected, and ports B and D are interconnected. In position II, ports A and D are interconnected, and ports B and C are interconnected.

The hydraulic transmission apparatus 20 is controlled by an electronic control unit 50.

The electronic control unit is connected to the various solenoid valves and to the various sensors of the apparatus 20 via circuits that are shown in fragmentary manner only.

The control unit is connected to a switch 54, by means of which the driver of the vehicle 10 activates or deactivates the apparatus 20 via a control unit 50.

The control unit 50 is also connected to position sensors connected to the brake and acceleration pedals 55 of the vehicle (in FIG. 1, only one pedal is shown).

The control unit 50 controls activation and deactivation of the apparatus 20 by acting on the solenoid valve 40: it causes the solenoid valve to go into to its position II in order to activate the apparatus so that the apparatus goes into its activated mode; and it causes the valve 40 to go into its position I in order to deactivate the apparatus 20 so that the apparatus returns to its deactivated mode.

In the deactivated mode, the pump ducts 28A and 28B are interconnected, via the activation valve 34 placed in position I. The motor ducts are connected via port B of the valve 34 to the reservoir 52 and are thus maintained at atmospheric pressure.

Activation of the motors 26A and 26B (and, by extension, of the apparatus 20) thus takes place in the following manner:

The valve 40 going from position I to position II triggers engagement, or activation of the motors 26A, 26B, in the following manner: Once the valve 40 goes to position II, the "boost pressure" delivered by the auxiliary pump 25 is applied to the hydraulic chamber 34A instead of to the chamber 34B. The hydraulic valve 34 thus goes from position I (unassisted mode) to position II (drive mode).

Almost instantly, the delivery pressure of the main pump is transmitted to the first motor duct 30, while the pressure at the suction orifice 24B of the pump 24 is applied to the second motor duct 32.

Under the effect of this pressure, the pistons of the motors 26A and 26B come to extend from their cylinders in which they were previously in the retracted position, and are placed in contact with the cams of the motors 26A and 26B. In a manner known per se, they then deliver drive torque under the effect of the fluid pressure prevailing in the motor ducts.

Conversely, for deactivating the motors 26A and 26B and thus for deactivating the apparatus 20, the activation valve 34 is used. The motors 26A and 26B are deactivated by causing the apparatus 20 to go into the unassisted mode, which takes place by means of the valve 34, by causing said valve to go into the position I in order to bypass the motors.

However, the apparatus 20 offers a second method of making the motors 26A and 26B inactive: While keeping the apparatus 20 activated (valve 34 in position II), the apparatus 20 is operated in the "torque-free" mode.

To make this mode of operation possible, the control unit is suitable for regulating the cylinder capacity of the pump 24, by means of two identical solenoid valves 36A, 36B.

Each of these solenoid valves has two upstream ports connected respectively to the boost duct 41 and to an unpressurized reservoir 56, and one downstream port. The downstream ports of the two valves 36A, 36B are connected to respective ones of the hydraulic control chambers 22A, 22B of the pump 24.

These hydraulic chambers 22A and 22B make it possible to control the position of the swashplate of the pump 24, in a manner known per se, and they thus make it possible to control the cylinder capacity of the pump 24.

As a function of the command that is applied to them, the valves 36A and 36B apply either the boost pressure, or atmospheric pressure, to the hydraulic chambers 22A or 22B to which they are connected.

Thus, via the valves 36A and 36B, the control unit 50 is able to control the cylinder capacity of the pump 24.

In addition, the control unit 50 is arranged in such a manner as to be able to operate the apparatus 20 in a "torque-free" mode. In this mode, the motors 26A and 26B do not deliver any torque, because the cylinder capacity of the pump is regulated by the unit 50 in such a manner that the pressures at the feed orifice 24A and at the discharge orifice 24B of the pump 24 are substantially equal.

In order to make such regulation possible, the apparatus 20 has two pressure sensors 27 disposed respectively on the pump duct 28A and on the motor duct 32. When the valve 34 is in position II, these sensors transmit to the control unit 50 the values of the pressures $P_A$ and $P_B$ prevailing respectively at the feed and discharge orifices of the motors 26A and 26B.

On the basis of these pressure values, the control unit 50 causes the value of the cylinder capacity of the pump 24 to vary and regulates it in such a manner that the pressures $P_A$ and $P_B$ become equal. This regulation can be performed by any appropriate control algorithm, e.g. by using proportional-integral-derivative (PID) control or the like.

Thus, in this mode of regulation, the system uses the pressure information given by the pressure sensors 27 to determine the cylinder capacity of the pump.

In addition, the lower of these pressures (normally $P_B$ when the vehicle is moving forwards) is constrained to be equal to the exchange pressure $P_E$ by the exchange valve 60.

Figure 2:
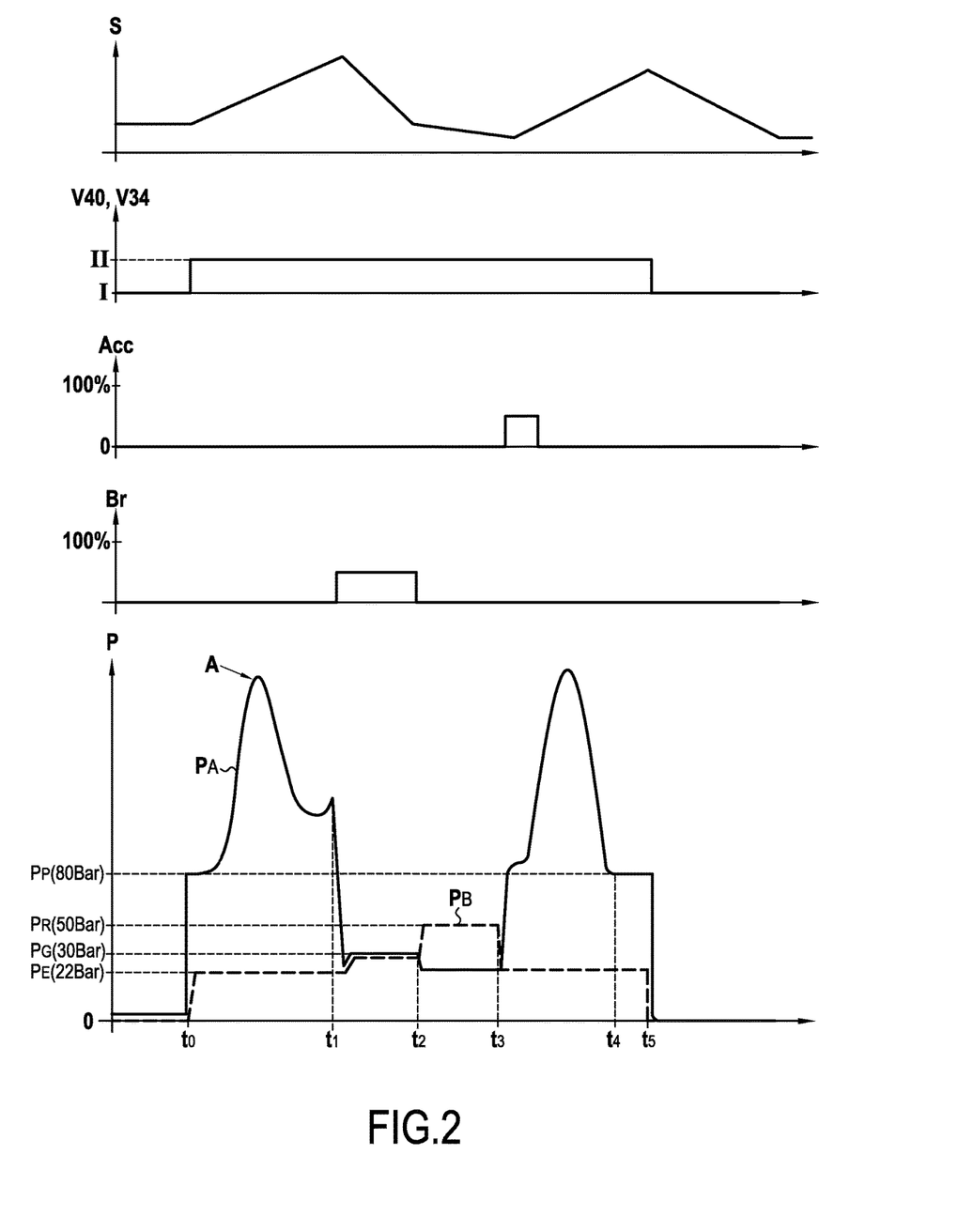
FIG. 2 shows a set of curves showing how various parameters vary, in a vehicle in which apparatus of the invention is mounted, on implementing the method of the invention.

The method of controlling the apparatus 20 is described below with reference to FIG. 2.

This figure shows an example of how a vehicle 10 behaves, and in particular how the apparatus 20 behaves, when a set of commands are successively applied to it while the vehicle is moving.

The figure has a time axis as the axis of abscissas.

Various magnitudes are plotted up the axis of ordinates, namely going from the top down:

The speed S of the vehicle;

The position (respectively V40 or V34) of the valves 40 and 34;

The position Acc of the accelerator pedal;

The position Br of the brake pedal; and

The values of the pressures $P_A$ and $P_B$ prevailing at respective ones of the feed and discharge orifices of the motors 26A and 26B. (The pressure measured by the pressure sensor 27 connected to the pump duct 28B is thus equal to the pressure $P_B$ indicated by the curve of FIG. 2 when the valve 34 is in position II only).

During an initial period preceding an instant t0, the vehicle 10 is travelling at medium speed, without hydraulic assistance, e.g. along a horizontal portion of a road. The apparatus 20 is deactivated, and the valve 34 is in position I.

At instant t0, the driver of the vehicle 10 activates the apparatus 20 because, for example, the ground is becoming more slippery and because the driver wishes to benefit from the hydraulic assistance imparted by the apparatus 20, which makes it possible to have four wheel drive.

For this purpose, the driver puts the activation control switch 54 of the apparatus 20 into the closed position. Closure of this contact indicates to the control unit 50 that the apparatus 20 should be activated. The control unit then activates the valve 40 (instant t0), and the valve goes over to position II. As a result, the valve 34 also goes over from position I to position II and then remains in position II.

The control unit then puts the apparatus 20 in assistance mode, which is the default mode.

In this mode of operation, the unit 50 constrains the pump 24 to have the cylinder capacity Cy, but only on condition that the feed pressure $P_A$ of the motors 26A and 26B remains not less than a minimum threshold pressure. The minimum threshold pressure is referenced PP and is equal to 80 bars in the vehicle 10. If the feed pressure $P_A$ is tending to become lower than said minimum pressure $P_P$, the unit 50 regulates the cylinder capacity of the pump in such a manner that said feed pressure remains equal to 80 bars.

Therefore, as soon as the apparatus 20 is activated at instant t0, the pressure $P_A$ increases sharply to settle at the value of 80 bars. At the same time, the pressure $P_B$ increases to settle at the value of the exchange pressure $P_E$ (22 bars).

Soon after instant t0, the pressure $P_A$ tends to rise above 80 bars, probably due to slight wheel spin of the rear wheels 12A and 12B (arrow A). The control unit then modifies the position of the swashplate of the pump 24 in such a manner that the cylinder capacity of the pump becomes equal to the cylinder capacity Cy.

The pressure $P_A$ then fluctuates, as a function of the variations in speed, and thus in delivery rate, of the pump 24.

At instant t1, the vehicle is on a slope and the driver of the vehicle brakes. The driver depresses the brake pedal 55. That depressing is immediately detected by the control unit 50.

Said control unit then immediately causes the apparatus 20 to go over to torque-free mode. For that purpose, while maintaining the valve 34 in position II, the unit 50 starts to regulate the cylinder capacity of the pump 24 in such a manner that the pressures $P_A$ and $P_B$ at the feed and discharge orifices of the motors 26A and 26B remain substantially equal.

The exchange valve 60 thus goes into its middle position and closes.

Very rapidly, the pressure $P_A$ in the duct 28A decreases, in order to become equal to the pressure $P_B$.

The pressure in the two pump and motor ducts fed by the boost pump 25 then settles at the value of the boost pressure $P_G$, i.e. at 30 bars.

Simultaneously, under the effect of the braking, the speed of the vehicle decreases. During this stage, since the torque delivered by the motors 26A and 26B is zero, the apparatus 20 makes no contribution of any sort to the braking.

Then at an instant t2, while the vehicle is still on the slope, the driver of the vehicle ceases to brake. The control unit perceives the discontinuation of the pressing on the brake pedal, and causes the apparatus 20 to go over from the torque-free mode to the restraint mode.

For this purpose, while maintaining the valve 34 in the activated position II, the control unit 50 regulates the cylinder capacity of the pump 24 in such a manner that the pressure $P_B$ in the return duct 28B is not less than (and optionally equal to) the restraint pressure $P_R$ (50 bars).

In parallel, the exchange valve 60 becomes active again and constrains the pressure in the pump duct 28A to reach the pressure of the exchange pressure $P_E$ (22 bars).

The pressure difference (50 bars–22 bars) between the discharge and feed orifices of the motors results in the motors delivering a small amount of braking torque. Under the effect of this torque, the speed of the vehicle continues to decrease, but more slowly than during the braking stage.

At instant t3, the driver no longer wishes to decelerate, but rather wishes to re-accelerate gradually. The driver thus depresses the accelerator pedal.

As soon as this command is detected, the control unit 50 causes the vehicle to go back over to assistance mode. The speed of the vehicle increases again.

In a first stage, and more precisely between instant t3 and a subsequent instant t4, the pressure at the feed orifices of the motors is greater than the threshold pressure of 80 bars. The cylinder capacity of the pump is thus maintained at the value Cy.

As from instant t4, the pressure at the feed orifices of the motors tends to become less than the threshold pressure of 80 bars. The control unit then regulates the cylinder capacity of the pump 24 in such a manner as to maintain the pressure $P_A$ at the value of 80 bars.

At instant t5, the driver wishes to deactivate the apparatus 20. The driver puts the activation control switch 54 of the apparatus 20 into the open position.

The control unit 50 puts the valve 40 in position I. The valve 34 therefore also takes up position I. The apparatus 20 is then deactivated, and the motors 26A and 26B are in the bypass position.

The control unit 50 could also be configured so that, when the brake pedal is released during a stage with hydraulic assistance, it puts the vehicle 10 back into assistance mode rather than putting it in restraint mode.

In the preceding example, the invention is illustrated by an embodiment with two motors 26A and 26B placed in parallel. Naturally, the invention may also be implemented with any number of motors, and regardless of their configuration (in series, in parallel, or a combination of these two configurations), provided that zero torque is obtained at the outlets of the motors and that the pressures at two points of the circuit (in general points respectively upstream and downstream of the motors) are equal. Thus, in such a situation, in order to put the apparatus in torque-free mode, the control unit controls the cylinder capacity of the pump in such a manner that the pressures at said two points remain equal.

Figure 3:
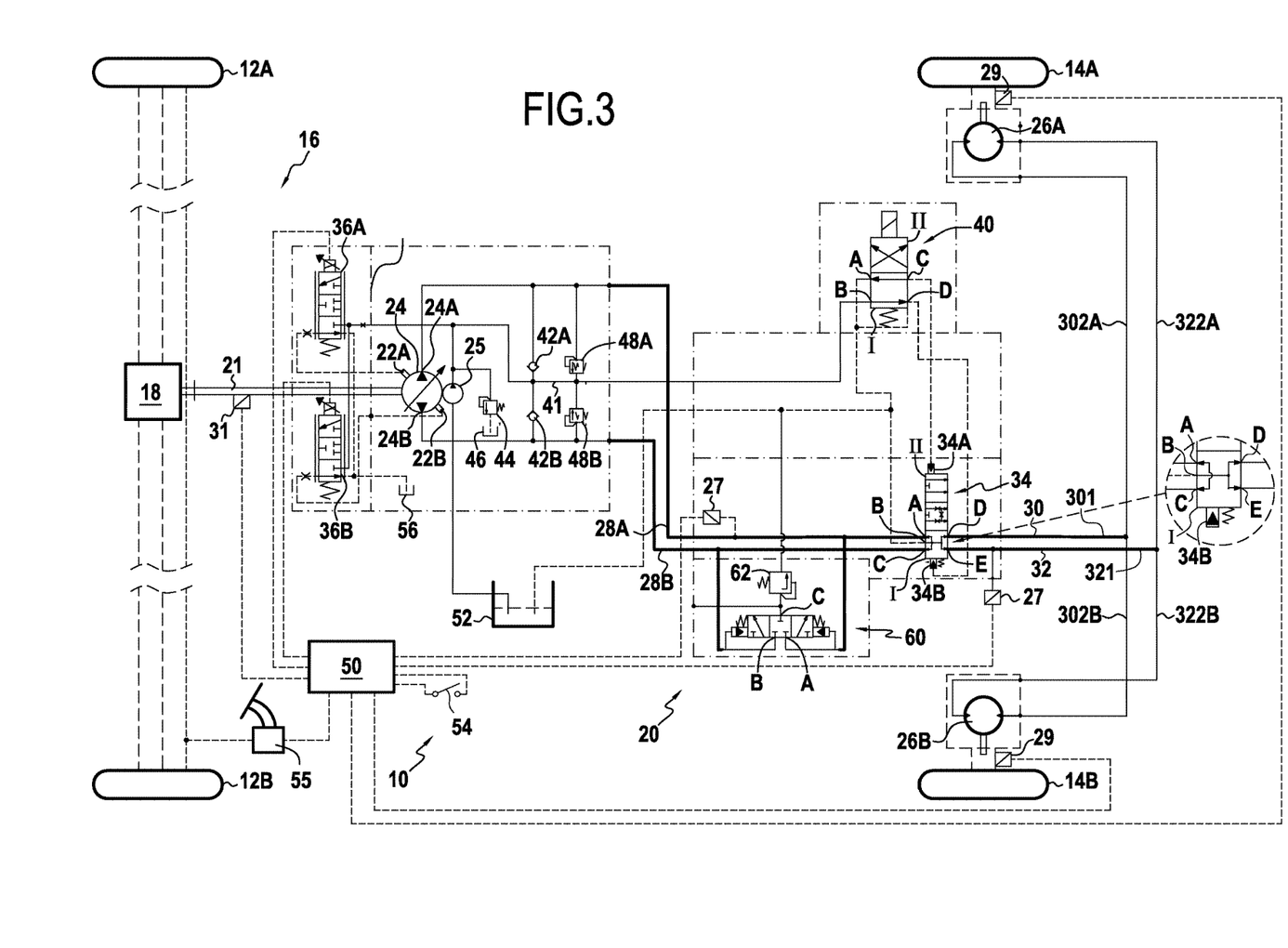
FIG. 3 is a diagrammatic view of a second embodiment of apparatus of the invention.

Finally, FIG. 3 shows a second embodiment of the invention. This embodiment is identical to the first embodiment described with reference to FIG. 2, except for the following points.

In this embodiment, the cylinder capacity of the pump is not regulated on the basis of the pressure measurements of the pressure sensors 27, but rather on the basis of measurements of wheel rotation speeds.

The wheels 14A and 14B are used as the reference vehicle mover members for moving the vehicle.

For acquiring the information making it possible to determine the speed of rotation of the wheels 14A and 14B (reference mover members), the apparatus includes speed sensors 29 that measure the speeds of rotation of the wheels directly (the wheels are also constrained to rotate with the outlet shafts of the motors 26A and 26B) and that transmit said speeds to the control unit 50.

In the embodiment shown in FIG. 3, the sensors 29 are placed on the wheels 14A and 14B, but they may also (and indeed preferably) be placed on the wheels 12A and 12B.

The apparatus further includes a speed sensor 31 that measures the speed of rotation of the shaft 21, which is also the speed of rotation of the rotor of the pump 24. The information measured by the sensor 31 is transmitted to the control unit 50.

In this mode of regulation, the cylinder capacity of the pump 24 is regulated without using pressure sensors.

The control unit 50 determines the cylinder capacity of the pump on the basis of the wheel rotation speed information delivered by the sensors 29, and on the basis of the rotor rotation speed information concerning the speed of rotation of the rotor of the pump 24 and delivered by the sensor 31. The cylinder capacity of the pump is computed such that the speeds of rotation of the outlet shafts of the hydraulic motors 26A, 26B, as computed on the basis of the speed of rotation of the rotor of the pump 24 and on the basis of the respective cylinder capacities of the pump and of the motors, are equal to the actual speeds of rotation of the outlet shafts of the motors 26A, 26B (i.e. the speeds of rotation of the wheels 14A, 14B) as measured by the sensors 29.

The speed of rotation of the shaft of the pump 24 together with the cylinder capacity of said pump determines the rate of fluid delivered by the pump 24 towards the motors 26A, 26B. The speeds of rotation of the outlet shafts of the motors are deduced from this delivery rate, given the cylinder capacities of said motors.

By choosing a pump cylinder capacity that makes the speeds of rotation of the outlet shafts of the motors 26A, 26B equal to the speeds of rotation of the wheels 14A, 14B, the control unit 50 controls the pump 24 in such a manner that the fluid pressures at the feed and discharge orifices of the motors 26A, 26B remain substantially equal, and that the motors 26A and 26B do not deliver any torque to their outlet shafts.

However, the apparatus 20 also has the same pressure sensors 27 as the apparatus of the first embodiment of the invention.

On the basis of the pressure information delivered by the sensors 27, in the torque-free mode, the control unit 50 checks that the pressure difference between the feed and discharge orifices of the hydraulic motors is less than a predetermined pressure difference. If this condition is not satisfied, the control unit transmits a warning signal to the driver of the vehicle.

The invention claimed is:

1. Hydraulic transmission apparatus comprising:
    a pump having a variable cylinder capacity;
    at least one hydraulic motor, fed by the pump;
    a control circuit controlled by a control unit; and
    pressure sensors suitable for transmitting to the control circuit the values of pressures at feed and discharge orifices of said at least one hydraulic motor;
    wherein:
    said at least one motor is arranged in such a manner that when the pressures in the feed and discharge orifices of said at least one hydraulic motor are equal, outlet torque from said at least one motor is zero; and
    the control circuit is arranged in such a manner that in an operating mode of the apparatus, the control unit operates the apparatus in a torque free mode by regulating the cylinder capacity of the pump, on the basis of the pressure information given by said pressure sensors, in such a manner that the pressures at said feed and discharge orifices remain substantially equal, while the fluid continues to flow between the pump and said at least one motor.

2. Hydraulic transmission apparatus according to claim 1, wherein the control circuit is suitable for operating the apparatus in a restraint mode, in which the cylinder capacity of the pump is regulated in such a manner that the pressure at the discharge orifice of said at least one motor is greater by at least a predetermined value than the pressure at the feed orifice of said at least one motor.

3. Hydraulic transmission apparatus according to claim 1, further comprising an activation valve suitable, in a first position, for putting the pump into communication with said at least one motor so as to feed it, and, in a second position, conversely, for isolating the pump from said at least one motor, and wherein the control circuit is designed such that, immediately after the activation valve goes over from the second position to the first position, and/or immediately before the activation valve goes over from the first position to the second position, said control circuit either operates the apparatus in torque-free mode, or regulates the cylinder capacity of the pump in such a manner that the feed pressure of said at least one motor is not less than a predetermined value.

4. A vehicle including braking apparatus, hydraulic transmission apparatus according to claim 1, and at least one vehicle mover member driven by said at least one motor; the vehicle having an operating mode in which, when the braking apparatus is actuated, the control circuit operates the hydraulic transmission apparatus in torque-free mode.

5. A vehicle according to claim 4, wherein the control circuit is arranged so that, after braking, it automatically operates the apparatus in a restraint mode, in which mode the cylinder capacity of the pump is regulated in such a manner that the pressure at the discharge orifice of said at least one motor is greater by at least a predetermined value than the pressure at the feed orifice of said at least one motor.

6. A vehicle according to claim 4, wherein the control circuit is suitable for operating the apparatus in a braking mode, in which the cylinder capacity of the pump is regulated in such a manner that the pressure at the discharge orifice of said at least one motor is greater than the pressure at the feed orifice of said at least one motor by a value that is a function of a braking command transmitted to the vehicle.

7. A vehicle according to claim 4, further including an internal combustion engine and a mechanical main transmission; and wherein the pump is driven by an outlet shaft associated with said engine or with a gearbox coupled to said engine.

8. A vehicle including a hydraulic transmission apparatus, and a vehicle mover member;
    the hydraulic transmission apparatus comprising:

a pump having a variable cylinder capacity;
at least one hydraulic motor, fed by the pump;
a control circuit controlled by a control unit;
acquisition means suitable for transmitting to the control circuit information making it possible to determine the value of the speed of rotation of two vehicle mover members used as a reference; and
a pump speed sensor suitable for transmitting to the control circuit information making it possible to determine the speed of rotation of a rotor of said pump;
wherein:
said at least one motor is arranged in such a manner that when pressures in feed and discharge orifices of said at least one motor are equal, outlet torque from said at least one motor is zero;
the control circuit is suitable for operating the apparatus in a torque free mode by regulating the cylinder capacity of the pump in such a manner that the pressures at said feed and discharge orifices remain substantially equal, while the fluid continues to flow between the pump and said at least one motor; and
the control circuit is further arranged in such a manner that, in torque-free mode, it determines the value of the speed of rotation of the reference mover member and the speed of rotation of the rotor of the pump, and it regulates the delivery rate of the pump as a function of the speed of rotation of the rotor of the pump in such a manner that the outlet member of said at least one motor turns at a speed equal to the speed determined for the reference mover member.

9. A vehicle according to claim 8, wherein the hydraulic transmission apparatus further comprises pressure sensors suitable for transmitting to the control circuit the values of the pressures at the feed and discharge orifices of said at least one motor, and wherein the control circuit is arranged in such a manner that, in torque-free mode, the control circuit checks that the difference between the pressures at the feed and discharge orifices of said at least one motor is less than a predetermined value, on the basis of the pressure information given by said pressure sensor.

10. A vehicle according to claim 8, wherein the control circuit is arranged so that, after braking, it automatically operates the apparatus in a restraint mode, in which mode the cylinder capacity of the pump is regulated in such a manner that the pressure at the discharge orifice of said at least one motor is greater by at least a predetermined value than the pressure at the feed orifice of said at least one motor.

11. A vehicle according to claim 10, including front mover members and rear mover members, and wherein the control circuit is arranged so that, if an acceleration command is transmitted to the vehicle while said vehicle is in restraint mode, said control circuit automatically causes the hydraulic transmission apparatus to go over to assistance mode, in which the cylinder capacity of the pump is generally maintained at a fixed value determined in such a manner that the speed of rotation of the front mover members is not less than the speed of rotation of the rear mover members.

12. A vehicle according to claim 8, wherein the control circuit is suitable for operating the apparatus in a braking mode, in which the cylinder capacity of the pump is regulated in such a manner that the pressure at the discharge orifice of said at least one motor is greater than the pressure at the feed orifice of said at least one motor by a value that is a function of a braking command transmitted to the vehicle.

13. A vehicle according to claim 8, further including an internal combustion engine and a mechanical main transmission; and wherein the pump is driven by an outlet shaft associated with said engine or with a gearbox coupled to said engine.

14. A method of controlling a hydraulic transmission apparatus, said hydraulic transmission apparatus adapted to be mounted in a vehicle having an engine, a mechanical transmission apparatus and a hydraulic transmission apparatus connected in parallel to the engine;
said hydraulic transmission apparatus comprising a pump having a variable delivery rate, at least one hydraulic motor, fed by the pump, and a control circuit controlled by a control unit;
wherein, in the hydraulic transmission apparatus, said at least one motor is arranged in such a manner that when pressures in feed and discharge orifices of said at least one motor are equal, outlet torque from said at least one motor is zero; and
wherein the step of controlling the hydraulic transmission apparatus comprises during a period, operating the hydraulic transmission apparatus in a torque-free mode, in which mode the transmission is active with the fluid continuing to flow between the pump and said at least one motor; and during this period, the control unit actively regulates the cylinder capacity of the pump in such a manner that the pressures at said feed and discharge orifices remain substantially equal between the pump and said at least one motor.

15. A method of controlling hydraulic transmission apparatus according to claim 14, wherein, in addition, during a restraining period, the apparatus is operated in a restraint mode, in which the cylinder capacity of the pump is regulated in such a manner that the pressure at the discharge orifice of said at least one motor is greater by at least a predetermined value than the pressure at the feed orifice of said at least one motor.

16. A method of controlling hydraulic transmission apparatus according to claim 14, mounted in a vehicle having two axles with driven wheels, a front one of the axles being situated in front of a rear other axle, relative to the direction of movement of the vehicle; the wheels of a single one of said axles being driven by the hydraulic transmission apparatus; in which method, in addition, during an assistance period, the apparatus is operated in an operating mode in which the cylinder capacity of the pump is generally maintained at a fixed value determined in such a manner that the speed of rotation of the wheels of the front axle is not less than the speed of rotation of the wheels of the rear axle.

17. A method of controlling hydraulic transmission apparatus according to claim 14, implemented on board a hydraulically driven vehicle including braking apparatus, said hydraulic transmission apparatus, and at least one vehicle mover member driven by said at least one motor; in which method, when the braking apparatus of the vehicle is actuated, the hydraulic transmission apparatus is operated in torque-free mode.

18. A method of controlling hydraulic transmission apparatus according to claim 17, wherein, when the braking apparatus of the vehicle ceases to be actuated, the apparatus is operated in a restraint mode, in which mode the cylinder capacity of the pump is regulated in such a manner that the pressure at the discharge orifice of said at least one motor is greater by at least a predetermined value than the pressure at the feed orifice of said at least one motor.

* * * * *